US007801281B2

(12) United States Patent
Van Natter et al.

(10) Patent No.: US 7,801,281 B2
(45) Date of Patent: Sep. 21, 2010

(54) COLLECTING AND DELIVERING CALL DATA ASSOCIATED WITH COURT ORDERED TRAPS

(75) Inventors: Douglas Van Natter, Birmingham, AL (US); Ronald Proctor, Birmingham, AL (US); Abboud Madi, Birmingham, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1321 days.

(21) Appl. No.: 11/217,835

(22) Filed: Sep. 1, 2005

(65) Prior Publication Data

US 2006/0093113 A1 May 4, 2006

Related U.S. Application Data

(63) Continuation-in-part of application No. 10/980,590, filed on Nov. 3, 2004, now Pat. No. 6,987,845.

(51) Int. Cl.
*H04M 1/24* (2006.01)
*H04M 3/08* (2006.01)
*H04M 3/22* (2006.01)
*H04M 15/00* (2006.01)

(52) U.S. Cl. ............... 379/32.05; 379/32.01; 379/126; 379/134

(58) Field of Classification Search ............ 379/32.01, 379/32.02, 32.05, 35, 112.01, 112.02, 126, 379/133, 134, 136, 137
See application file for complete search history.

(56) References Cited

U.S. PATENT DOCUMENTS 5,325,290 A 6/1994 Cauffman et al. ............. 705/34

(Continued)

OTHER PUBLICATIONS

Elmasri R. et al., "Fundamentals of Database Systems," 2004, pp. 455-491.

(Continued)

*Primary Examiner*—Quoc D Tran
(74) *Attorney, Agent, or Firm*—Hope Baldauff Hartman LLC

(57) ABSTRACT

Methods, systems, and computer program products collect and deliver call data associated with court ordered trap and/or traces. A method involves receiving a request to monitor calls to and/or from a target telephone number where the request includes request parameters such as the target telephone number. The method further involves storing the request where the target telephone number is stored in association with a court order and utilizing the request to identify and retrieve call records matching the request parameters. Utilizing the request to identify and retrieve call records matching the request parameters may involve creating a text file including the request parameters, reading the request parameters from the text file, monitoring call records for call records matching the request parameters, and storing call records that match the request parameters. The call records that match are stored in association with the court order and the target telephone number.

13 Claims, 9 Drawing Sheets

U.S. PATENT DOCUMENTS

| | | | | |
|---|---|---|---|---|
| 5,680,611 | A | 10/1997 | Rail et al. | 707/101 |
| 5,930,344 | A * | 7/1999 | Relyea et al. | 379/126 |
| 6,233,313 | B1 * | 5/2001 | Farris et al. | 379/112.01 |
| 6,658,099 | B2 | 12/2003 | Perkins, III | 379/112.01 |
| 6,987,845 | B1 * | 1/2006 | Van Natter et al. | 379/126 |
| 2001/0056362 | A1 | 12/2001 | Hanagan et al. | 705/7 |
| 2005/0086062 | A1 | 4/2005 | Clark et al. | 705/1 |
| 2005/0276386 | A1 * | 12/2005 | Ethier et al. | 379/32.05 |

OTHER PUBLICATIONS

Invitation to Pay Additional Fees with Annex to Form PCT/ISA/206 Communication Relating to the Results of the Partial International Search dated May 11, 2006, (PCT/US2005/039473).

U.S. Official Action dated Dec. 28, 2009 in U.S. Appl. No. 11/266,717.

* cited by examiner

```
600 ──┐  ┌─604  ┌─605   ┌─607     ┌─610     ┌─612              ┌─615 ┌─617
       ↓  Call   Call    Calling   Called    Call     ┌─614     Call
  Number Date   Time     Number    Number    Duration Answd Carrier Type

┌─602
CALL DETAILS FOR TARGET NUMBER: 2059881295

#1 12/15/04 14:33:27e 404-221-8942 205-988-1295  0:23.5  Yes  AT&T   110
 #2 12/15/04 15:02:30e 704-861-2914 205-988-1295  1:24.3  Yes         006
 #3 12/15/04 08:39:31c 205-988-1295 205-988-6880  0:34.6  Yes         001
 #4 12/15/04 08:40:24c 205-988-1295 404-521-5280 78:05.6  Yes         006
 #5 12/15/04 10:04:21c 205-988-1295 404-370-8253  2:12.6  Yes         006
 #6 12/15/04 10:32:39c 205-977-0311 205-988-1295  1:17.3  Yes         001
 #7 12/15/04 11:33:41c 205-988-1295 800-639-6111  2:10.1  Yes  MCI    141
 #8 12/15/04 11:36:00c 205-988-1295 800-639-6111  2:19.4  Yes  MCI    141
 #9 12/15/04 13:33:25c 404-221-8942 205-988-1295  0:24.0  Yes  AT&T   119
#10 12/15/04 14:08:38c 205-988-1295 704-861-2955  2:20.0  Yes         006
           ┌─618
Call Codes:

001  Detailed Message Rate, Timed, with MBI
006  Station Paid
110  InterLATA Station Paid
119  Terminating Access Record
141  IC Number Service Call
         ┌─620
Carriers:

0222  MCI    MCIWorldCom
0288  AT&T   AT&T Communications

┌─622
SUBSCRIBER INFORMATION

1. Telephone: 205-977-0311
                BELLSOUTH TELECOMM INC DBA SOUTH CENTRAL BELL TEL
                BIRMINGHAM, AL
                Subscriber not Found.

2. Telephone: 205-988-1295
                BELLSOUTH TELECOMM INC DBA SOUTH CENTRAL BELL TEL
624 ─┐          BIRMINGHAM, AL
     `Status: OPEN    Type: BUSINESS
      ┌─Listed: BASC;                 625
627          1876 Data Dr
      ┌─Service: 1876 DATA DR, Room S-4
630          HOOVER, 3. Telephone: 205-988-6880
                BELLSOUTH TELECOMM INC DBA SOUTH CENTRAL BELL TEL
                BIRMINGHAM, AL
```

*Fig. 6*

COLLECTING AND DELIVERING CALL DATA ASSOCIATED WITH COURT ORDERED TRAPS

CROSS-REFERENCE TO RELATED APPLICATION

This application is a continuation-in-part of U.S. Pat. No. 6,987,845 entitled "Methods, Systems, and Computer-Readable Mediums for Indexing and Rapidly Searching Data Records," filed Nov. 3, 2004, which is entirely incorporated herein by reference.

TECHNICAL FIELD

The present invention generally relates to rapidly searching and/or collecting data records and, more particularly, relates to methods, computer-readable mediums, and systems for collecting and delivering call data associated with court ordered traps.

BACKGROUND

Telecommunications companies periodically receive requests to collect information about recent or forthcoming telephone calls to and/or from targeted telephone numbers. This information is then delivered to law enforcement agencies. The requests come in the form of a legally authorized court ordered traps, traces, and/or pen register traps covering a specified period of time. Additionally, internal security departments for telecommunications companies may need to request call records to investigate internal security issues. Historically, a trap or trace is used for calls from the target number and a pen register trap is used for calls to a target number. Previous methods for processing traps or traces require a significant amount of mainframe processing and time. Thus, previous systems are slow at executing or processing traps of this kind, typically taking a number of days to complete a report. Because previous systems are so slow, the mainframe or billing system costs alone to process traps and traces, such as those mentioned above, can be expensive.

Accordingly there is an unaddressed need in the industry to address the aforementioned and other deficiencies and inadequacies.

SUMMARY

This Summary is provided to introduce a selection of concepts in simplified form that are further described below in the Detailed Description. This Summary is not intended to identify key features or essential features of the claimed subject matter, nor is the Summary intended to be used as an aid in determining the scope of the claimed subject matter.

In accordance with embodiments of the present invention, methods, systems, and computer program products collect and deliver call data associated with a court ordered trap or trace to address the above and other problems. Moving this collection and delivery from a mainframe environment to a computing apparatus, such as a personal computer (PC), significantly lowers the costs and inefficiency of processing court ordered traps. The methods, computer program products, and systems that search for, retrieve, and deliver call records associated with court ordered traps, as disclosed in embodiments of the present invention, are fast, inexpensive and scalable to larger data sets.

One embodiment provides a computer-implemented method for collecting and delivering call data associated with a court ordered trap. The method involves receiving a request to monitor calls to and/or from a target telephone number identified in the court ordered trap. The request includes request parameters such as the target telephone number. The method further involves storing the request where the target telephone number is stored in association with a court order and utilizing the request to identify and retrieve call records matching the request parameters. Utilizing the request to identify and retrieve call records matching the request parameters may involve creating a text file including the request parameters, reading the request parameters from the text file, monitoring call records for call records matching the request parameters, and storing call records that match the request parameters. The call records that match are stored in association with the court order and the target telephone number.

Another embodiment is a computer program product including a computer-readable medium having control logic stored therein for causing a computer to collect and deliver call data associated with a court ordered trap. The control logic includes computer-readable program code for causing the computer to receive a request to monitor calls to or from a target telephone number, store the request, and utilize the request to identify and retrieve call records matching the request parameters. The target telephone number is stored in association with a court order and the request includes one or more request parameters. The request parameters may include the target telephone number, a court order identifier, a name of the requestor submitting the request, a verbatim type of the request, and/or a date range to monitor the calls. The request parameters may further include a new status indicator for the request, a frequency to deliver trap results, and/or a delivery location.

The computer program product also includes computer-readable program code for causing a computer to create a text file including the request parameters, read the request parameters from the text file, and monitor incoming call records for call records matching the request parameters. The computer-readable program code also causes the computer to index the incoming call records for a designated region and collect call records that match the request parameters. The call records that match are stored in association with the court order and the target telephone number.

Additionally, the computer program product may include computer-readable program code for causing a computer to send an update request for matching call records from a variety of regions, receive the call records that match from one or more regions, merge the call records that match into a single history file associated with the court order and the target telephone number, and remove duplicate call records from the call records that match.

Still another embodiment is computer-implemented system for collect and deliver call data associated with a court ordered trap to monitor one or more target telephone numbers. The system includes a first computer operative to receive a request to monitor calls to or from the target telephone numbers, store the request, and utilize the request to identify and retrieve call records matching the request parameters. The request includes request parameters including the target telephone numbers stored in association with a court order. The request parameters may further include a court order identifier, a name of a requestor submitting the request, a verbatim type of the request, and/or a date range to monitor the calls. The request parameters may also include a new status indicator for the request, a frequency to deliver trap results, and/or a delivery location.

The system may also include a second computer operative to create a text file including the request parameters, read the request parameters from the text file, and monitor incoming call records for call records matching the request parameters. The second computer is also operative to index the incoming call records for a designated region and collect call records that match the request parameters. The call records that match are stored in association with the court order and the target telephone number. And the first computer is operative to forward the request parameters to the second computer.

Still further, the first computer is operative to send an update request for call records, from a variety of regions, that match the request parameters, receive from one or more regions the call records that match, merge the call records that match into a single history file associated with the court order and the target telephone numbers; and remove duplicate call records from the call records that match. The first computer may also be operative to retrieve subscriber information associated with each telephone number in the call records that match, generate a report including the call records that match and the subscriber information, and send the report to the requestor.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIG. 6 illustrates a display of trap results utilized in an illustrative embodiment of the invention;

DETAILED DESCRIPTION

Figure 1:
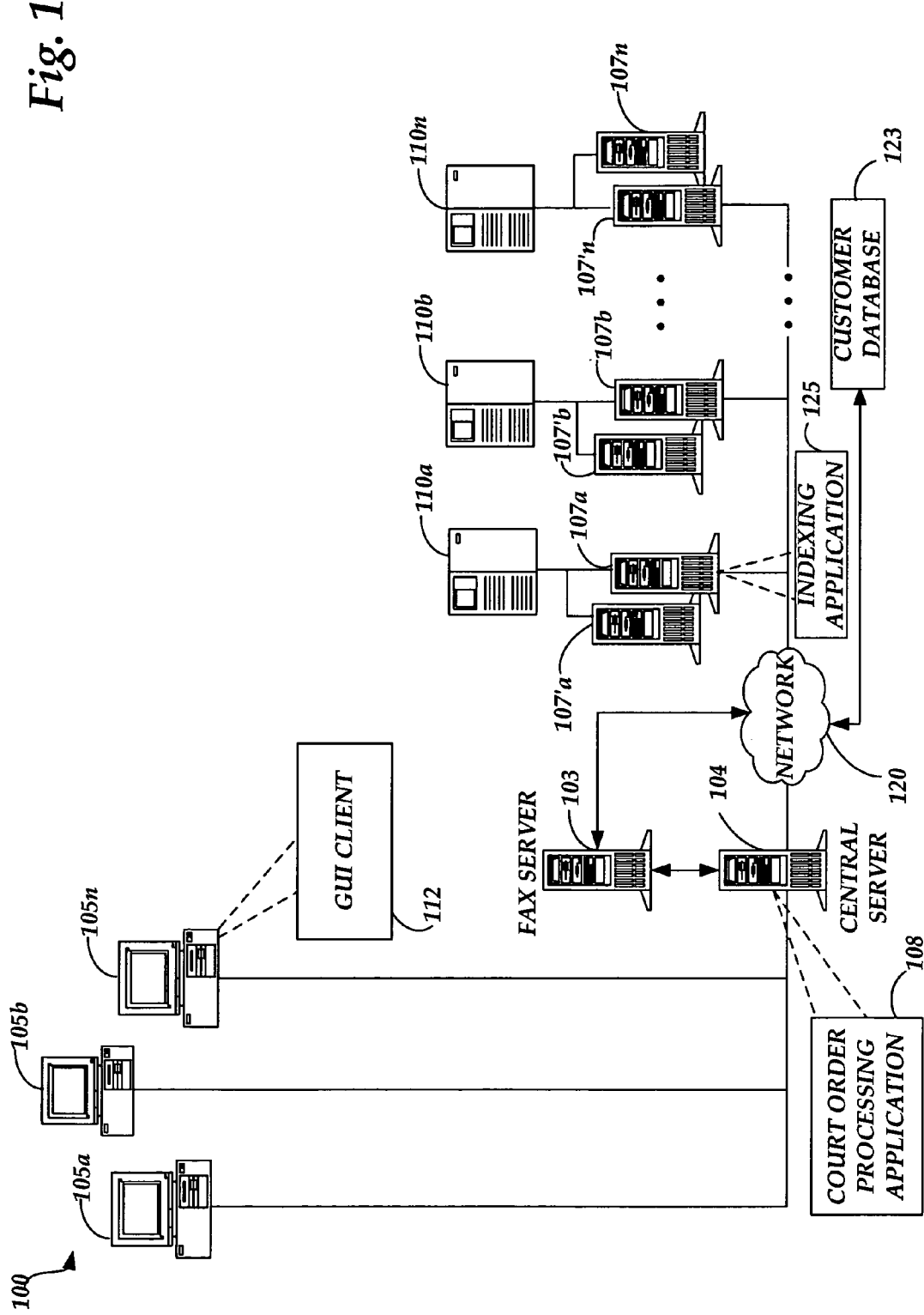
FIG. 1 is a schematic diagram illustrating aspects of a personal computer (PC), server, and billing system networked environment utilized in an illustrative embodiment of the invention.

As described briefly above, embodiments of the present invention provide methods, systems, and computer-readable mediums for collecting and delivering call data associated with a court ordered trap. In the following detailed description, references are made to accompanying drawings that form a part hereof, and in which are shown by way of illustration specific embodiments or examples. These illustrative embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Referring now to the drawings, in which like numerals represent like elements through the several figures, aspects of the present invention and the illustrative operating environment will be described. FIGS. 1-4 and the following discussion are intended to provide a brief, general description of a suitable computing environment in which the embodiments of the invention may be implemented. While the invention will be described in the general context of program modules that execute in conjunction with a BIOS program that executes on a personal or server computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, a schematic diagram illustrating aspects of a personal computer (PC), server, and mainframe billing system networked environment 100 utilized in an illustrative embodiment of the invention will be described. As shown in FIG. 1, the networked environment 100 includes PCs 105a-105n, a central server 104, search servers 107a-107n, backup search servers 107'a-107'n, a fax server 103, and mainframe billing systems 110a-110n. The fax server 103 contains one or more fax modems which are used to deliver the results to law enforcement agents. The network 100 also includes a customer database 123. Each PC 105a-105n is a client PC of the central server 104 and includes a graphical user interface (GUI) client application 112. For instance, a law enforcement agent obtains a court order authorizing a telecommunications provider to gather call records and deliver them to the agent. The court order is delivered to a court order specialist (mailed, Faxed, or hand delivered). Court order specialists use the GUI Client 112 to enter information about the court order. The GUI applications provide a vehicle for the central server 104 to receive court ordered trap requests from users via a search interface and to display retrieved search results. The GUI client 112 can also be used to add, change or delete an existing court order. Additional details regarding the GUI client 112 will be described below with respect to FIG. 2.

The central server 104, which includes a court order processing application (COP) 108, receives court ordered trap requests from the client PCs 105 and forwards the court ordered trap requests to each search server 107a-107n and backup search server 107'a-107'n. The COP 108 provides an interface between the GUI client 112 and the search servers 107 and 107'. Each search server 107 and 107' updates a trap request text file residing on the server. Additionally, the COP 108 maintains a database with information about many different court orders. The COP 108 also formats and delivers the results to the Fax Server 103. In some cases, the results can be printed and mailed, stored on a diskette and either mailed or hand delivered to the law enforcement agents, or emailed to the appropriate law enforcement agent. Each server 107a-107n downloads call record data from a respective billing system 110a-110n each day. An indexing application 125 on each search server 107 or 107' examines the call records to determine whether any call data matches parameters of the court ordered trap request. When a search server is executing an indexing task, it gathers information (call records) that is relevant to any of the court orders in the trap request file. Some embodiments of the indexing application 125 are described in U.S. Pat. No. 6,987,845 entitled "Methods, Systems, and Computer-Readable Mediums for Indexing and Rapidly Searching Data Records," filed Nov. 3, 2004, which is incorporated herein by reference. Additional details regarding the indexing application 125 will be described below with respect to FIG. 5.

The billing systems 110a-110n are regional, and thus capture call records for that region. Therefore, parallel searching of each region for call records may take place for each court ordered trap request. Parallel court ordered trapping enables smaller groups of records to be searched simultaneously, which allows the collection of call records to go faster than trying to trap all the data at a single location at once or consecutively. Furthermore, the searching and collecting of call records that fulfill the trap requests takes place on the search servers 107a-107n and the backup search servers 107'a-107'n and thus, does not require extensive billing system 110 resources or time.

Once, the indexing application 125 collects call records that fulfill the trap request, the collected call records are forwarded to the central server 104 in response to a request from the COP 108. In an embodiment of the present invention, based on the specified schedule for each court order, the COP 108 asks the search servers to return any information (call records) gathered since the previous day related to a particular court order. The COP 108 does this separately for each court order since each court order could potentially have a different schedule.

The COP 108 may also retrieve customer data associated with telephone numbers in the collected call records, such as name and address, from the customer database 123, such as a billing database. Once the call records and associated data are compiled, the COP 108 generates a trap results report that may be sent to the fax server 103 which will send it to the appropriate law enforcement agent. Alternate methods for delivering results include email, printing, copying to diskette, mail or hand delivery. This process may continue until the court order is either expired or deleted. Additional details regarding the trap results report will be described below with respect to FIG. 6.

Figure 2:
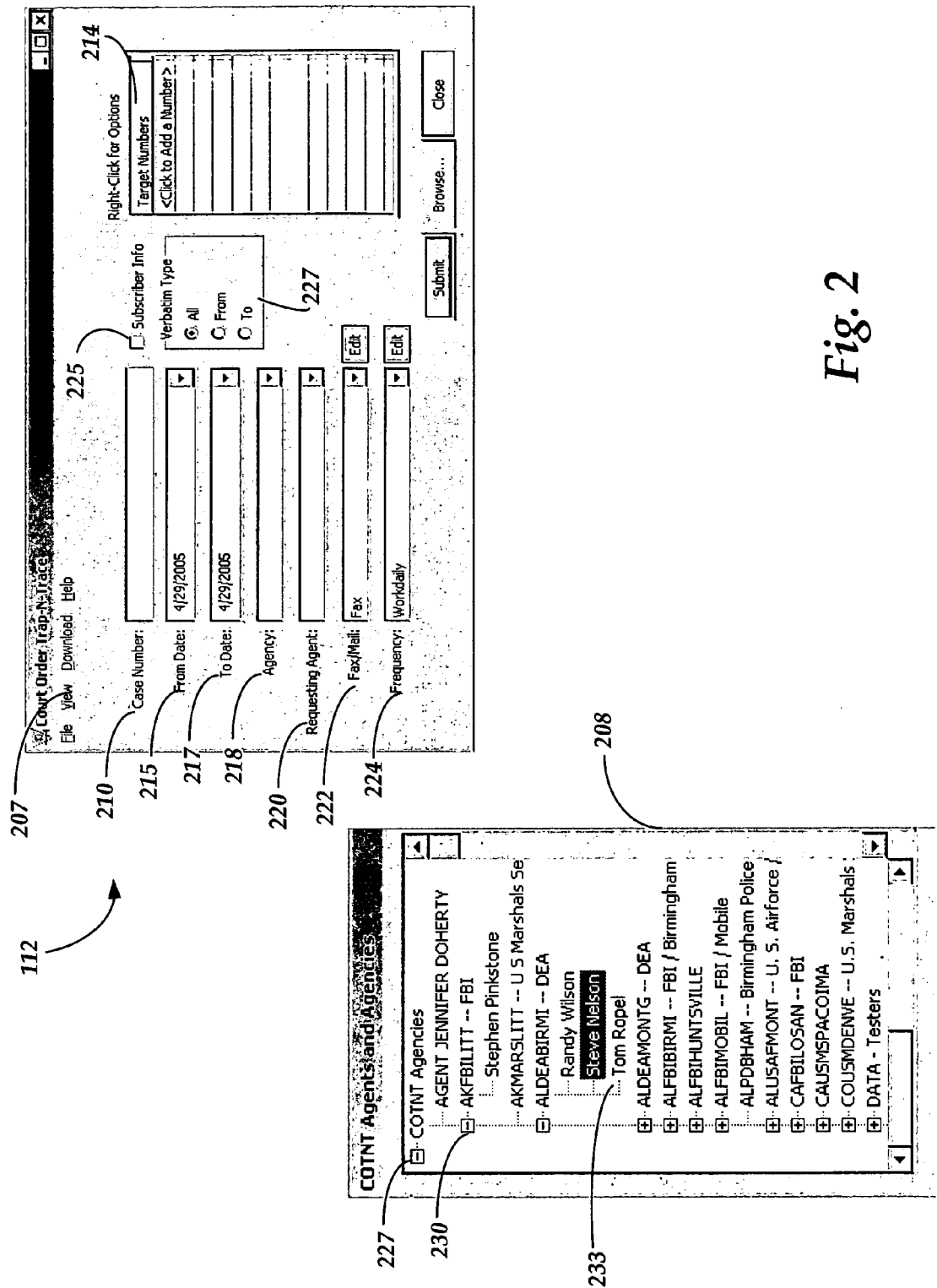
FIG. 2 illustrates an interface display for a main entry screen with an agent/agency tree utilized in an illustrative embodiment of the invention for inputting requests to monitor calls.

FIG. 2 illustrates an example of the GUI client 112 for a main entry screen with an agent/agency tree 208 utilized in an illustrative embodiment of the invention for inputting trap requests to monitor calls to and/or from a target telephone number(s). The GUI client 112 includes a variety of fields for receiving parameters related to processing a court ordered trap. For example, the GUI client 112 includes a target phone number field 214 for receiving one or more target phone numbers for which the trap was ordered, a case number field 210 identifying the court order associated with the trap request, and a From Date field 215 and a To Date field 217 for receiving a date or date range of the court ordered period for monitoring calls.

The GUI client 112 also includes an Agency field 218 and a requesting Agent field 220 for receiving data regarding the law enforcement agency and agent making the request. Additionally, when receiving a selection of a view menu 207, the GUI client 112 displays the agent/agency tree 208 for a menu listing of agencies and agents for pre-entry by selection into the GUI client 112 instead of typing in the names. The agency/agent tree 208 includes a type of agency branch 227, an individual agency listing branch 230 listing all the agencies for the type selected, and an agency branch listing a name 233 for individual agents associated with the agency selected.

Still further, the GUI client 112 includes a Fax/Mail field 222 for receiving information as to where to send the results of the court ordered trap, a frequency field 224 for receiving instructions as to how often to deliver the results from the trap, and a subscriber information indicator 225 for receiving an indication as to whether subscriber or customer information should be included in the trap results or the report. Additionally, the GUI client 112 includes a verbatim type indicator for receiving an indication as to whether calls to and/or from the target telephone numbers are to be monitored or trapped.

Figure 3:
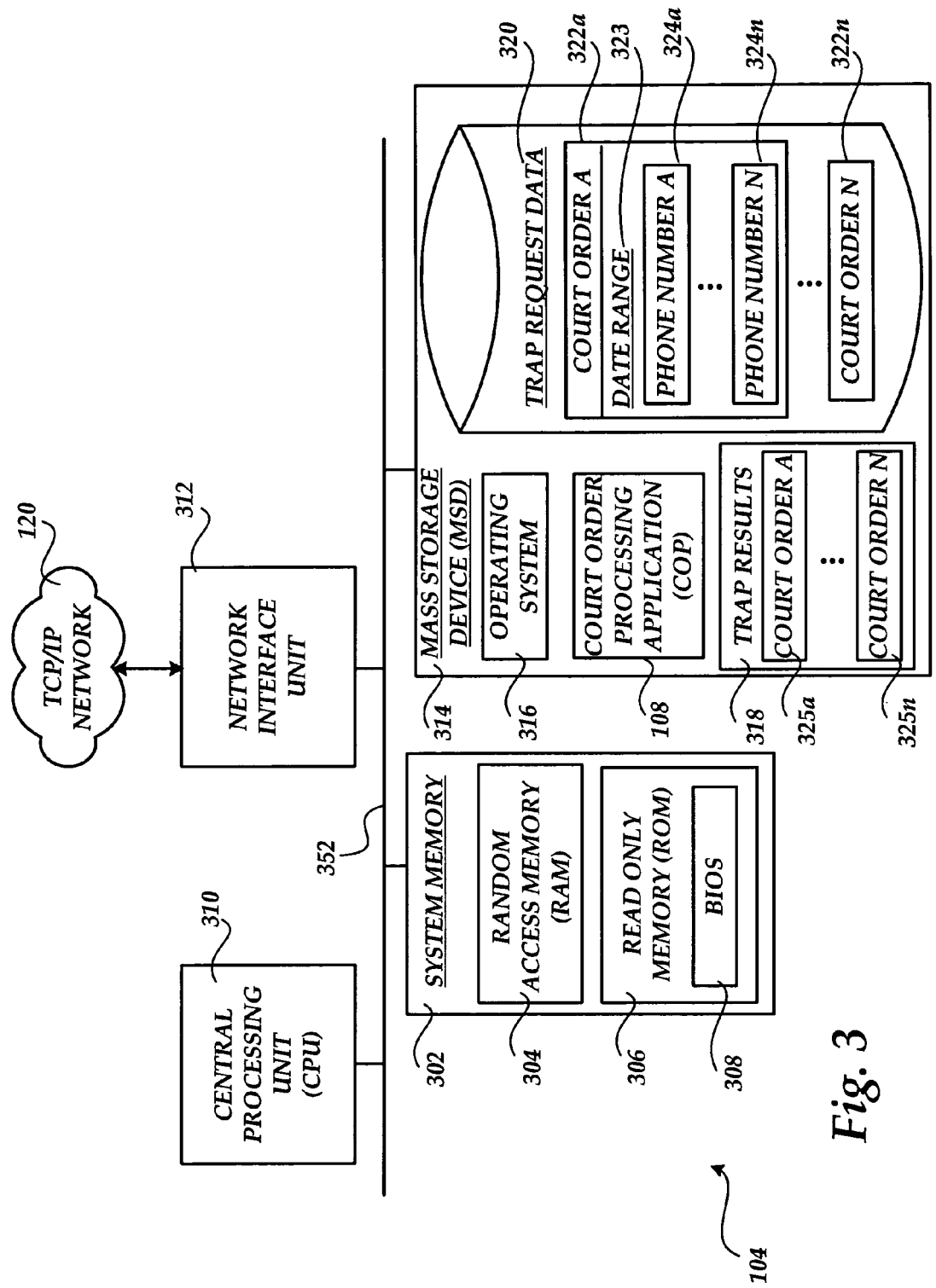
FIG. 3 illustrates computing system architecture for a central server computer utilized in an illustrative embodiment of the invention.

FIG. 3 illustrates a computing system architecture for the central server 104 utilized in an illustrative embodiment of the invention. The central server 104 includes a central processing unit (CPU) 310, a system memory 302, and a system bus 352 that couples the system memory 302 to the CPU 310. The system memory 302 includes read-only memory (ROM) 306 and random access memory (RAM) 304. A basic input/output system 308 (BIOS), containing the basic routines that help to transfer information between elements within the central server 104, such as during start-up, is stored in ROM 306. The central server 104 further includes a mass storage device (MSD) 314 for storing an operating system 316 such as WINDOWS XP, from MICROSOFT CORPORATION of Redmond, Wash., the COP 108 for processing court ordered traps, trap request data 320 for specifying request parameters in association with court orders and target telephone numbers, and trap results files 318 for storing call record data that has been merged and organized by the COP 108.

Trap request data 320 associated with specific court orders is stored in request parameter files 322a-322n, one for each court order. Each request parameter file 322a-322n includes a date range 323 for court order duration and target telephone number(s) 324a-324n associated with the court order. This information is received at the central server 104 via the GUI 112. Also, for each court order, the trap results files 318 include a results file 325a-325n that stores collected and merged call records received in response to the corresponding court ordered trap. Additional details regarding collecting call records will be described below with respect to FIGS. 4-5.

It should be appreciated that the MSD 314 may be a redundant array of inexpensive discs (RAID) system for storing data. The MSD 314 is connected to the CPU 310 through a mass storage controller (not shown) connected to the system bus 352. The MSD 314 and its associated computer-readable media, provide non-volatile storage for the central server 104. Although the description of computer-readable media contained herein refers to a mass storage device, such as a hard disk or RAID array, it should be appreciated by those skilled in the art that computer-readable media can be any available media that can be accessed by the CPU 310.

Figure 5:
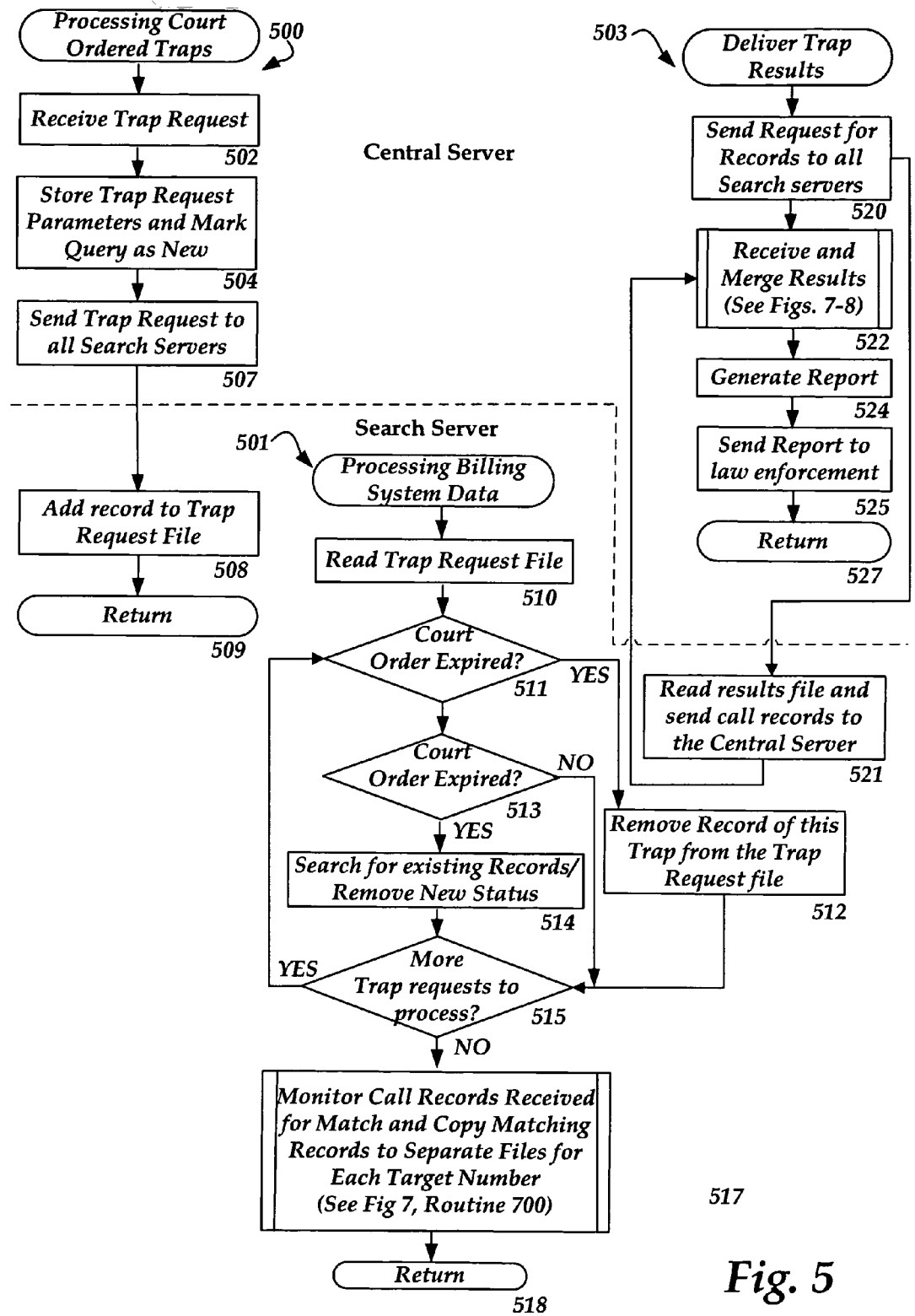
FIG. 5 illustrates an operational flow performed in collecting and delivering call data associated with a court ordered trap according to an illustrative embodiment of the invention.

The CPU 310 may employ various operations, discussed in more detail below with reference to FIG. 5 to provide and utilize the signals propagated between the central server 104 and the search servers 107 (FIG. 1). The CPU 310 may store data to and access data from mass storage device 314. Data is transferred to and received from the storage device 314 through the system bus 352. The CPU 310 may be a general-purpose computer processor. Furthermore as mentioned below, the CPU 310, in addition to being a general-purpose programmable processor, may be firmware, hard-wired logic, analog circuitry, other special purpose circuitry, or any combination thereof.

According to various embodiments of the invention, the central server 104 operates in a networked environment, as shown in FIG. 1, using logical connections to remote computing devices via network communication, such as an Intranet, or a local area network (LAN). The central server 104 may connect to the network 120 via a network interface unit 312. It should be appreciated that the network interface unit 312 may also be utilized to connect to other types of networks and remote computer systems.

A computing system, such as the central server 104, typically includes at least some form of computer-readable media. Computer readable media can be any available media that can be accessed by the central server 104. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, disk drives, a collection of disk drives, flash memory, other memory technology or any other medium that can be used to store the desired information and that can be accessed by the central server 104.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Figure 4:
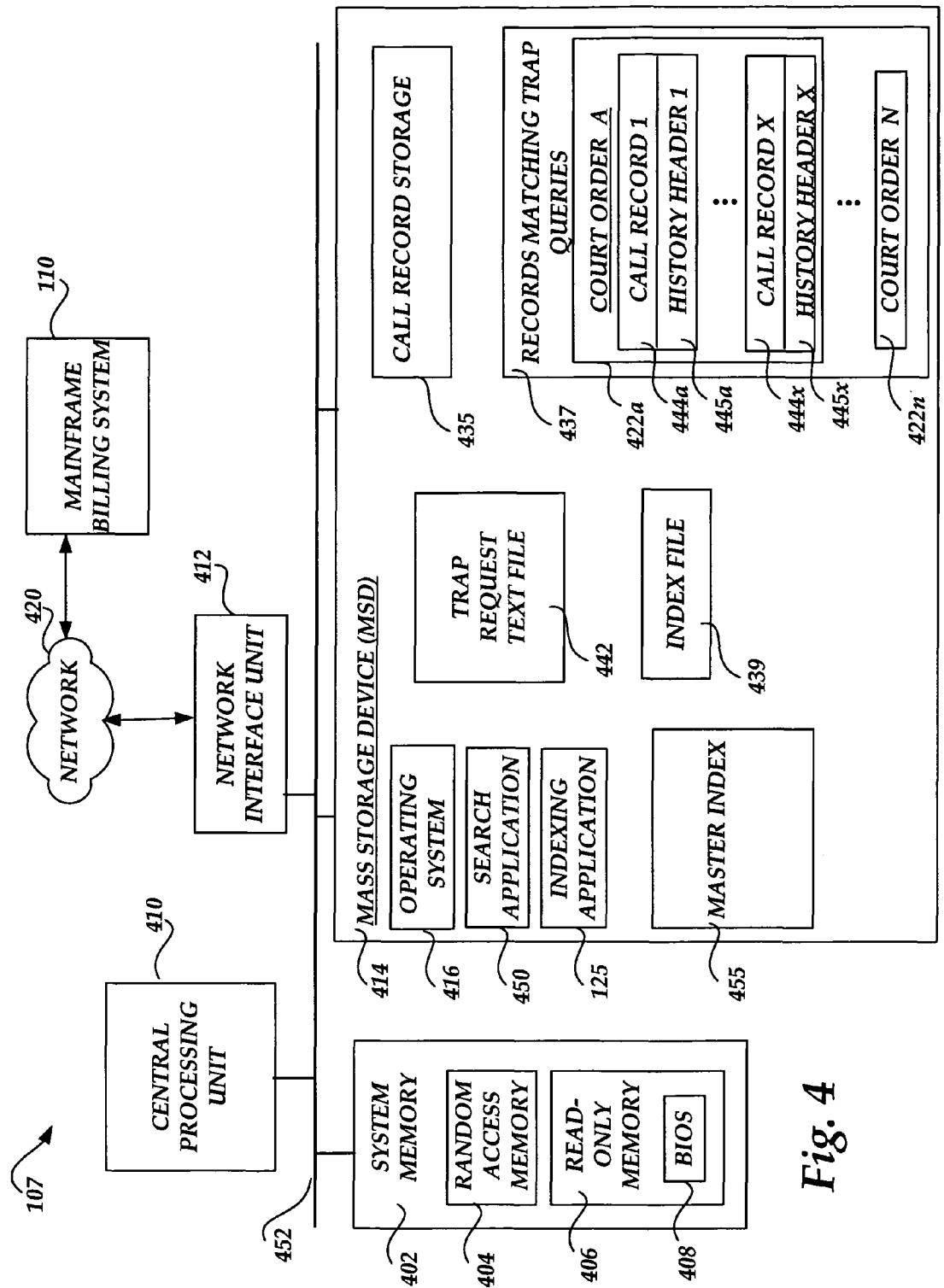
FIG. 4 illustrates computing system architecture for a search server computer utilized in an illustrative embodiment of the invention.

FIG. 4 illustrates a computing system architecture for a search server 107 utilized in an illustrative embodiment of the invention. The search server 107 is similar in architecture to the central server 104. The search server 107 includes a central processing unit (CPU) 410, a system memory 402, and a system bus 452 that couples the system memory 402 to the CPU 410. The system memory 402 includes read-only memory (ROM) 406 and random access memory (RAM) 404. A basic input/output system 408 (BIOS), containing the basic routines that help to transfer information between elements within the search server 107, such as during start-up, is stored in ROM 406. The search server 107 further includes a mass storage device (MSD) 414 for storing an operating system 416 such as WINDOWS XP, from MICROSOFT CORPORATION of Redmond, Wash., a search application 450 for searching data records, an indexing application 125 for indexing data. It should be appreciated that the MSD 414 may also be a redundant array of inexpensive discs (RAID) system for storing data.

The indexing application 125 indexes the call records downloaded to call record storage 435. Indexing of the call records produces temporary indexes, which are merged to create an index file 439 and a master index file 455 that includes master index records. As the indexing application 125 examines the call records for indexing, the indexing application 125 determines whether a call record meets or matches trap request parameters specified in a trap request text file 442. The COP 108 creates the trap request text file 442 on each search server 107 in response to receiving the trap request data at the central server 104. When a call record matches the request parameters specified in the trap request text file(s) 442, the indexing application 125 copies the matching call record to files 437 for call records that match the trap query.

The indexing application 125 organizes the call records in the files 437 according to the court order associated with a trap request. For example files 422a-422n include call records matching the trap queries specified in the text files 442. Each set of matching call records 444a-444x is associated with a unique history header 445a-445x. The unique history headers 445 help to identify duplicate call records between the search servers 107 and the backup servers 107'. Additional details regarding the indexing of call records are described in U.S. Pat. No. 6,987,845 entitled "Methods, Systems, and Computer-Readable Mediums for Indexing and Rapidly Searching Data Records," filed Nov. 3, 2004, which is incorporated herein by reference.

The MSD 414 is connected to the CPU 410 through a mass storage controller (not shown) connected to the system bus 452. The MSD 414 and its associated computer-readable media, provide non-volatile storage for the search server 107. Although the description of computer-readable media contained herein refers to a mass storage device, such as a hard disk or RAID array, it should be appreciated by those skilled in the art that computer-readable media can be any available media that can be accessed by the CPU 410.

The CPU 410 may employ various operations, discussed in more detail below with reference to FIG. 5 to provide and utilize the signals propagated between the search server 107 and the billing system 110 and the search server 107 and the central server 104. The CPU 410 may store data to and access data from mass storage device 414. Data is transferred to and received from the storage device 414 through the system bus 452. The CPU 410 may be a general-purpose computer processor. Furthermore as mentioned below, the CPU 410, in addition to being a general-purpose programmable processor, may be firmware, hard-wired logic, analog circuitry, other special purpose circuitry, or any combination thereof.

According to various embodiments of the invention, the search server 107 operates in a networked environment, as shown in FIG. 1, using logical connections to remote computing devices via network communication, such as an Intranet, or a local area network (LAN). The search server 107 may connect to a network 420 via a network interface unit 412. It should be appreciated that the network interface unit 412 may also be utilized to connect to other types of networks and remote computer systems.

A computing system, such as the search server 107, typically includes at least some form of computer-readable media. Computer readable media can be any available media that can be accessed by the search server 107. By way of example, and not limitation, computer-readable media might comprise computer storage media and communication media, as described above.

Referring now to FIGS. 1-5, operational flows 500, 501, and 503 performed in collecting and delivering call data associated with court ordered traps, according to an illustrative embodiment of the invention, will be described. The operational flow 500 begins at operation 502 where the central server 104 receives a trap request or trap query via the GUI Client 112. The operational flow then continues to operation 504 where the COP 108 stores the trap request parameters and marks the request as new. Here, the COP 108 flags the request with an indicator to identify the request as new.

Next, at operation 507, the COP 108 sends the trap request to each search server 107 and 107' in the networked environment 100. Next, the operational flow 500 continues to operation 508 where each search server 107 and 107' receives the request and adds a record to a text file that includes the request parameters, such as the information received via the GUI Client 112. Control returns to other routines at return operation 509.

Next at operational flow 501, when data arrives from the billing systems 110, the indexing application 125 reads the trap request file 442 at operation 510 and continues to operation 511.

At operation 511, the indexing application 125 determines whether the court order has expired. When the court order has expired, the operational flow 501 continues to operation 512 where a trap request record is removed from the trap request text file 442. Operational flow 501 then continues at operation 515, described below.

If the court order has not been expired, the flow 501 continues to operation 513 where the indexing application 125 determines whether the request is a new trap request. When the request is new, the operational flow 501 continues from operation 513 to operation 514 where the indexing application 125 searches for existing records that match the request parameters and removes new status from the request parameters. The functionality used for executing these searches is similar to that used by the search application 450, which is described in U.S. Pat. No. 6,987,845 entitled "Methods, Systems, and Computer-Readable Mediums for Indexing and Rapidly Searching Data Records,"filed Nov. 3, 2004, which is incorporated herein by reference.

Regardless of whether the trap request is new, the operational flow 501 continues at operation 515, where a determination is made about the existence of additional trap requests. If there are additional trap requests, the operational flow 501 returns to operation 511 described above. This loop continues until all trap requests have been reviewed.

Figure 7:
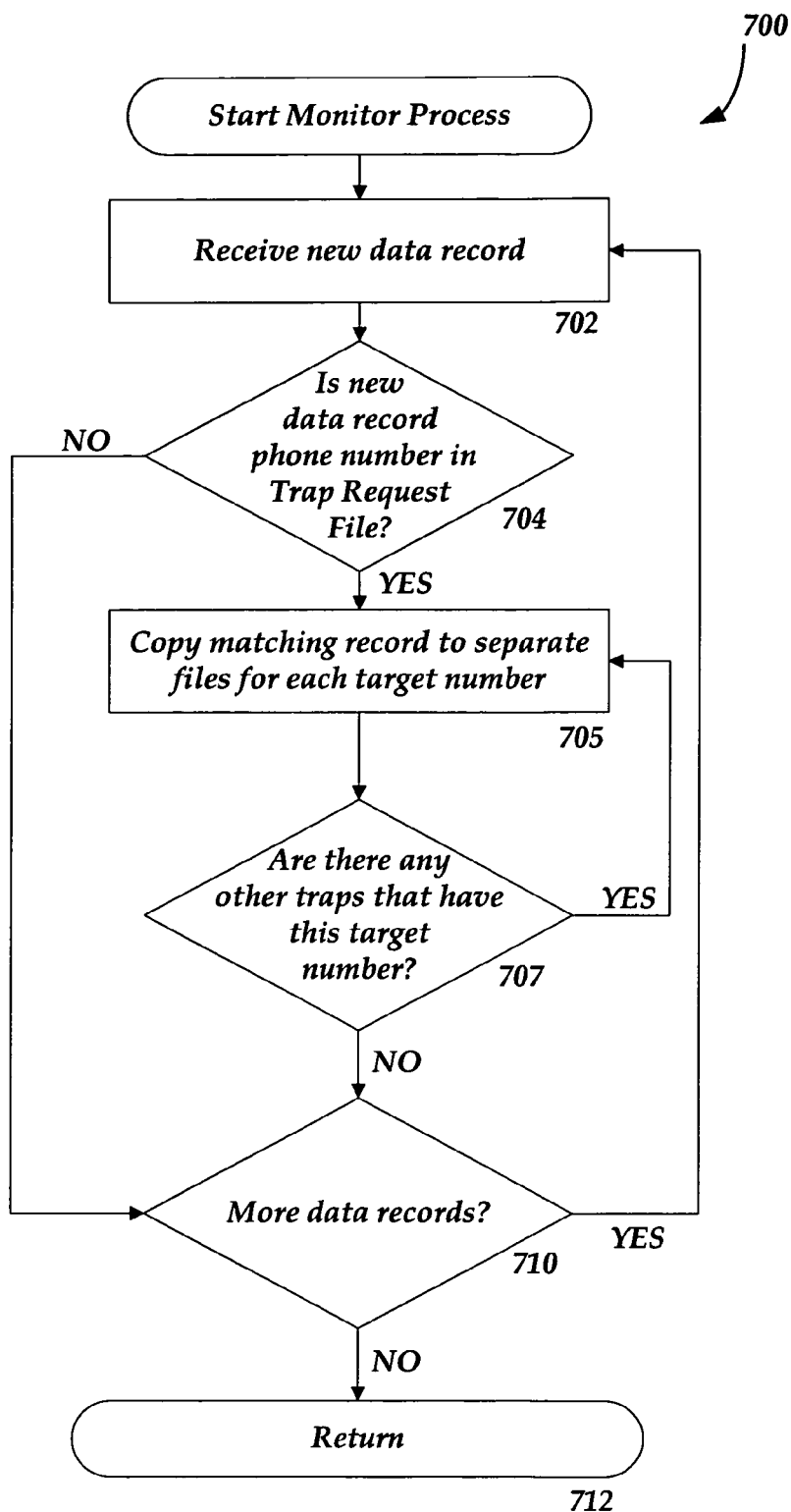
FIG. 7 illustrates an operational flow performed in monitoring for and copying call records that match court ordered trap requests according to an illustrative embodiment of the invention.

When all trap requests have been reviewed, the operational flow 501 continues at operation 517, where the indexing application 125 compares each call record received from the billing system against all trap requests to determine if this call record matches any of them. The indexing application 125 then copies the matching call records to a separate file 437, thereby storing them in association with the corresponding court order and target phone number. After all the call records have been received from the billing system 110, the operational flow 501 returns control to other routines at return operation 518. Additional details regarding monitoring and copying call records will be described below with respect to FIG. 7.

Figure 8:
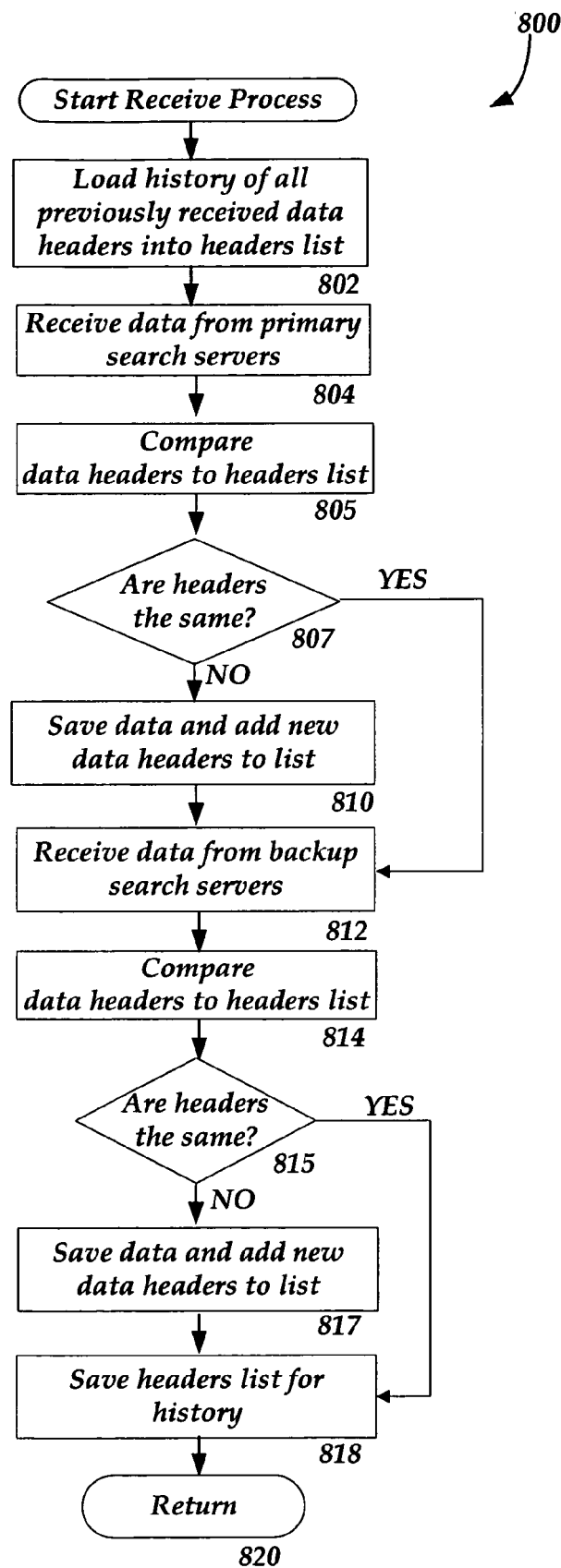
FIGS. 8-9 illustrate operational flows performed in receiving and merging call data associated with court ordered traps according to an illustrative embodiment of the invention.

Referring now to operational flow 503, at operation 520 the central server 104 sends a request for an update on call records to one or more search servers 107 and 107'. The operational flow 503 then continues from operation 520 to operation 521. At operation 521, each search server 107 and 107' reads the appropriate file and sends the results back to the central server 104. The operational flow 503 on the central server continues with operation 522. At operation 522, the COP 108 receives and merges the call records 444 from each search server 107 and 107' thereby eliminating duplicate call records based on the history headers 445. The COP 108 also retrieves subscriber information if requested. Additional details regarding receiving and merging call records will be described below with respect to FIGS. 8-9.

Next, at operation 524, the COP 108 generates a report, such as report 600 including the retrieved call records 444 and subscriber information associated with the court order as illustrated below in FIG. 6. Then at operation 525, the COP 108 sends the report to a fax server 103 and/or emails the results to the requesting law enforcement agent. The COP 108 then returns control to other routines at return operation 527.

FIG. 6 illustrates a display or report 600 of trap results utilized in an illustrative embodiment of the invention. The report 600, displayed via the client PC 105 or faxed to the requestor, includes the called phoned number 610, the calling phone number 607, the date of the call 604, time of the call 605, duration of the call 612, a carrier 615, a call type 617, and an indicator 614 as to whether the call was answered as well as other call record parameters.

The report 600 also includes a calling code legend 618 identifying call types 617, a carrier legend 620, and subscriber information 622. The subscriber information 622 may include a subscriber name 627, associated with a reported telephone number, a status 624 of the account, a type 625 of subscriber account, and a service address 630 associated with the subscriber.

Referring now to FIGS. 1, 4, 5, and 7 operational flow 700 performed in monitoring and copying call data associated with court ordered traps according to an illustrative embodiment of the invention will be described. The operational flow 700 begins at operation 702 where the search server 107 receives a new data record. Next at operation 704, the indexing application 125 determines whether a phone number in the data record is also in the trap request file 442.

When the phone number is not also in the trap request, the operational flow 700 continues from operation 704 to operation 710 described below. When the phone number is in the trap request file 442, the operational flow 700 continues to operation 705. At operation 705, the indexing application 125 copies the matching record to a separate file 422 for each target phone number.

Next, at operation 707, the indexing application 125 determines whether any other trap request includes the phone number in the call record. If another trap request includes the phone number the operational flow 700 returns to operation 705 described above. If another trap request does not include the phone number, the operational flow 700 continues to operation 710.

At operation 710 the search server 107 determines whether there are more data records. When there are more data records, the operational flow 700 returns to operation 702 described above. When there are no more data records, the operational flow 700 returns control to other routines at return operation 712.

Referring now to FIGS. 1, 3, 5, 8 and 9 operational flows 800 and 900 performed in receiving and merging call data associated with court ordered traps, according to an illustrative embodiment of the invention, will be described. The operational flow 800 begins at operation 802 where the central server 104 loads the history of all previously received data headers into a headers list.

Next at operation 804, the COP 108 receives data from the primary search servers 107. Then at operation 805, the COP 108 compares data headers 445 to the headers list. The operational flow continues at operation 807 where the COP 108 determines whether any headers are the same. When headers are the same, the operational flow 800 continues to operation 812 described below. When headers are not the same, the operational flow 800 continues to operation 810 where the COP 108 saves the data and adds new data headers to the headers list.

Next at operation 812, the COP 108 receives data from the backup search servers 107'. Then at operation 814, the COP 108 compares the data headers to the headers list. The operational flow 800 then continues at operation 815 where the COP 108 determines whether any headers are the same. When headers are the same, the operational flow 800 continues to operation 818 described below. When headers are not the same, the operational flow 800 continues to operation 817 where the COP 108 saves the data and adds new data headers to the headers list.

Next, at operation 818 the COP 108 saves the headers list for history. The operational flow 800 then returns control to other routines at return operation 820.

Figure 9:
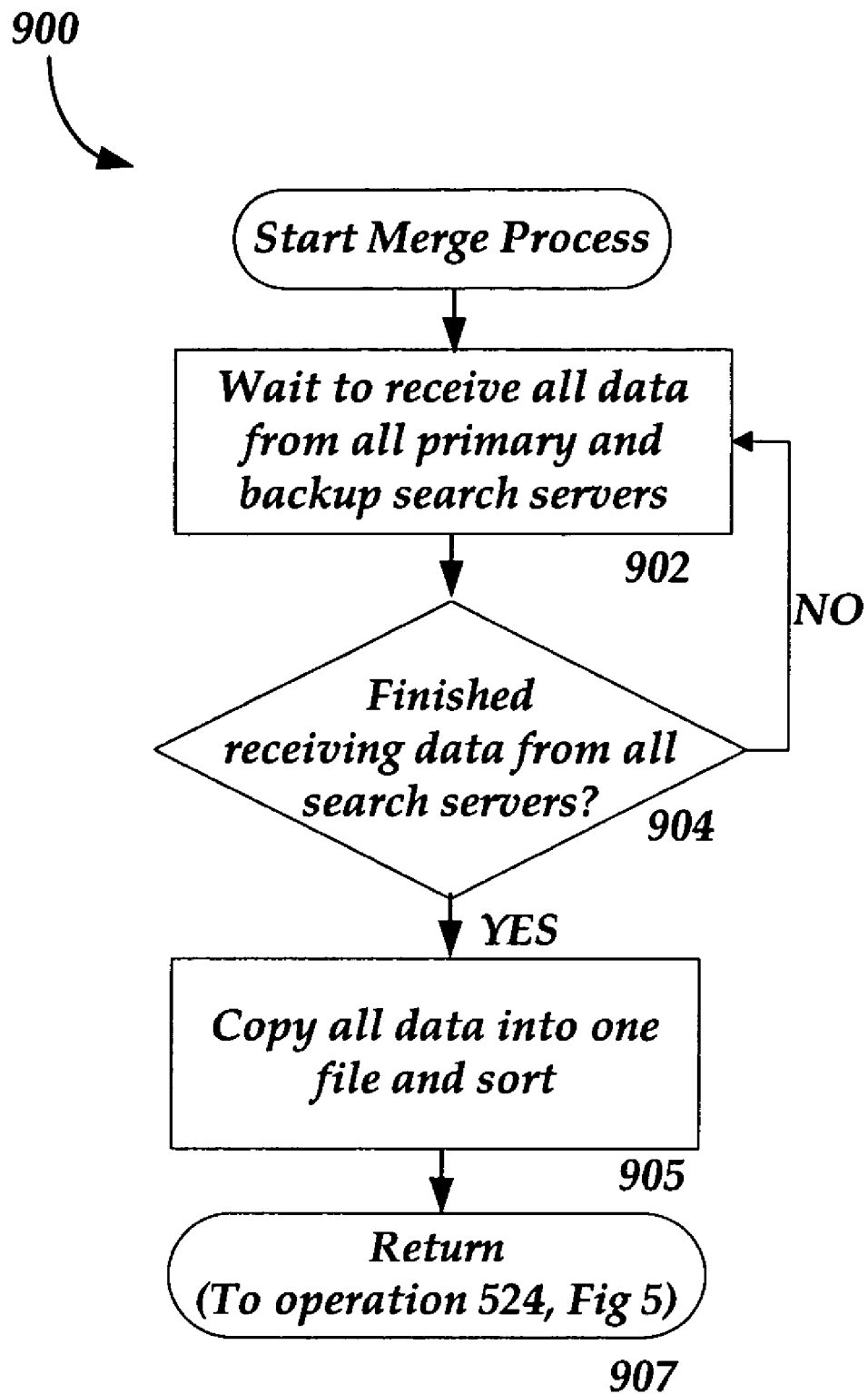

Referring to FIG. 9, the operational flow 900 begins at operation 902 where the central server 104 waits to receive all data from the primary and backup search servers 107 and 107'. Next at operation 904, the COP 108 determines whether all of the data has been received from the search servers 107 and 107'. If all the data has not been received, the operational flow 900 returns to operation 902 described above. When all the data has been received, the routine 900 continues to operation 905 where the COP 108 copies all the data received into a file 318 and sorts the data. Control is passed to operation 524, described with respect to FIG. 5 above, at return operation 907.

Thus, the present invention is presently embodied as methods, systems, computer program products or computer readable mediums encoding computer programs for processing court ordered traps in a computing system.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for processing a court ordered trap, the method comprising:
receiving a request to monitor calls to or from a target telephone number identified in the court ordered trap, wherein the request comprises one or more request parameters including the target telephone number, wherein receiving the request comprises receiving a query comprising the request parameters, the request parameters further including at least one of the following:
a court order identifier,
a name of a requestor,
a verbatim type of the request,
a date range to monitor the calls,
a new status indicator for the query,
a frequency to deliver trap results, and
a delivery location;
storing the request, wherein the target telephone number is stored in association with a court order;
utilizing the request to identify and to retrieve call records matching the request parameters from a plurality of call records, wherein utilizing the request to identify and retrieve call records matching the request parameters from a plurality of call records comprises sending the request to one or more search servers, wherein each search server receives and indexes call records for a designated region;
sending to the search servers an update request for the call records matching the request parameters from the plurality of call records;
receiving the call records that match;
merging the call records that match into a single history file associated with the court order and the target telephone number; and
removing duplicate call records from the call records that match.

2. The method of claim 1, wherein utilizing the request to identify and retrieve call records matching the request parameters from a plurality of call records comprises:
creating or updating a text file including the request parameters;
reading the request parameters from the text file;
monitoring a plurality of stored or incoming call records for the call records matching the request parameters; and
storing the call records that match the request parameters, wherein the call records that match are stored in association with the court order and the target telephone number.

3. The method of claim 1, wherein utilizing the request to identify and retrieve call records matching the request parameters from a plurality of call records comprises:
determining whether the query is a new query;
in response to the query being new:
searching for and retrieving existing call records within the date range that match the query from the plurality of call records;
removing new status from the query; and
storing the call records that match the query, wherein the call records that match are stored in association with the court order and the target telephone number.

4. The method of claim 1, wherein sending the request to the search servers comprises forwarding the request to a primary search server and a backup search server.

5. The method of claim 1, further comprising storing a header assigned to each call record in association with the court order and the target telephone number, wherein the header identifies an origin of the call record and wherein removing duplicate call records includes comparing headers assigned to the call records.

6. The method of claim 1, further comprising:
generating a report including the call records that match; and
sending the report to the requestor.

7. The method of claim 6, wherein sending the report comprises faxing the report to the delivery location.

8. The method of claim 6, further comprising:
retrieving subscriber information associated with each telephone number in the call records that match, wherein the subscriber information includes at least one of the following:
the telephone number,
a subscriber of the telephone number,
an address of the subscriber,
a name of a telecommunications carrier associated with the subscriber,
a type of subscriber account, and
a status to the subscriber account; and
including the subscriber information in the report.

9. A computer-readable storage medium having instructions stored thereon which, when executed by a computer, cause the computer to:

receive a request to monitor calls to or from a target telephone number, wherein the request comprises one or more request parameters including the target telephone number;
store the request, wherein the target telephone number is stored in association with a court order; and
utilize the request to identify and to retrieve call records matching the request parameters from a plurality of call records, wherein the request parameters include at least one of the following:
a court order identifier,
a name of a requestor submitting the request,
a verbatim type of the request,
a date range to monitor the calls,
a new status indicator for the request,
a frequency to deliver trap results, and
a delivery location,
wherein utilizing the request to identify and retrieve call records matching the request parameters from a plurality of call records comprises:
determining whether the request is a new request, and in response to the request being new:
searching for and retrieving existing call records within the date range that match the request parameters from the plurality of call records,
removing new status from the request, and
collecting the call records that match the request, wherein the call records that match are stored in association with the court order and the target telephone number, and
wherein utilizing the request to identify and retrieve call records matching the request parameters from a plurality of call records comprises:
sending an update request for call records from a variety of regions matching the request parameters,
receiving from one or more regions the call records that match,
merging the call records that match into a single history file associated with the court order and the target telephone number, and
removing duplicate call records from the call records that match.

10. The computer-readable storage medium of claim 9 further comprising instructions which, when executed by the computer, cause the computer to generate and display a menu tree of agencies and agents for selection of the requestor submitting the request.

11. The computer-readable storage medium of claim 9, wherein utilizing the request to identify and retrieve call records matching the request parameters from a plurality of call records:
creating a text file including the request parameters;
reading the request parameters from the text file;
monitoring incoming call records for call records matching the request parameters;
indexing the incoming call records for a designated region; and
collecting call records that match the request parameters, wherein the call records that match are stored in association with the court order and the target telephone number.

12. The computer-readable storage medium of claim 9, further comprising instructions which, when executed by the computer, cause the computer to:
retrieve subscriber information associated with each telephone number in the call records that match;
generate a report including the call records that match and the subscriber information; and
send the report to the requestor.

13. A computer-implemented system for collecting and delivering call data associated with a court ordered trap to monitor one or more target telephone numbers, the system comprising:
a court order processing application operative to:
receive a request to monitor calls to or from the target telephone numbers, wherein the request comprises one or more request parameters including the target telephone numbers,
store the request wherein the target telephone numbers are stored in association with a court order,
utilize the request to identify and retrieve call records matching the request parameters from a plurality of call records, wherein the request parameters further include at least one of the following:
a court order identifier,
a name of a requestor submitting the request,
a verbatim type of the request,
a date range to monitor the calls,
a new status indicator for the request,
a frequency to deliver trap results, and
a delivery location
send an update request for the call records from a variety of regions matching the request parameters,
receive the call records that match from one or more regions,
merge the call records that match into a single history file associated with the court order and the target telephone numbers,
remove duplicate call records from the call records that match,
retrieve subscriber information associated with each telephone number in the call records that match,
generate a report including the call records that match and the subscriber information, and
send the report to the requestor;
one or more search servers operative to:
create a text file including the request parameters,
read the request parameters from the text file, and
monitor incoming call records for call records matching the request parameters from the plurality of call records; and
an indexing application operative to:
index the incoming call records for a designated region, and
collect the call records that match the request parameters, wherein the call records that match are stored in association with the court order and the target telephone number,
wherein the court order processing application is further operative to forward the request parameters to the search servers.

* * * * *